United States Patent [19]
Koksbang

[11] Patent Number: 5,342,710
[45] Date of Patent: Aug. 30, 1994

[54] LAKYER FOR STABILIZATION OF LITHIUM ANODE

[75] Inventor: Rene Koksbang, San Jose, Calif.

[73] Assignee: Valence Technology, Inc., San Jose, Calif.

[21] Appl. No.: 40,228

[22] Filed: Mar. 30, 1993

[51] Int. Cl.$^5$ .................. H01M 6/18; H01M 4/58
[52] U.S. Cl. ..................... 429/192; 429/218
[58] Field of Search ............... 429/192, 191, 218

[56] References Cited

U.S. PATENT DOCUMENTS

| | | |
|---|---|---|
| Re. 31,532 | 3/1984 | Schneider et al. |
| 3,773,557 | 11/1973 | Mead |
| 3,957,533 | 5/1976 | Mead et al. |
| 4,071,662 | 1/1978 | Mead et al. |
| 4,148,975 | 4/1979 | Schneider et al. |
| 4,182,798 | 1/1980 | Skarstad |
| 4,340,651 | 7/1982 | Howard et al. |
| 4,812,376 | 3/1989 | Rudolph |
| 4,830,939 | 5/1989 | Lee et al. |

OTHER PUBLICATIONS

J. P. Gabano, Lithium Batteries, Academic Press, New York, Dec. 1983, pp. 432–437.

A. A. Schneider et al., "Performance Characteristics of a Long Life Pacemaker Cell", D. H. Collins (ed.), Power Source 5, Proc. 9th Int. Symp., Brighton 1974, Academic Press, London, Dec. 1975.

Primary Examiner—John S. Maples
Attorney, Agent, or Firm—Linda Deschere

[57] ABSTRACT

In a preferred battery, a negative electrode contains metallic lithium, a positive electrode contains transition metal chalcogen compound having a reversible lithium insertion ability, a solid electrolyte is disposed between the electrodes, and a protective layer is disposed between the solid electrolyte and the negative electrode. The protective layer contains polyvinyl pyridine (PVP) or derivatives thereof and iodine complexed with the PVP or derivatives thereof for reducing passivation of the lithium-containing negative electrode. Preferably the polyvinyl pyridine is poly-2-vinylpyridine or poly-2-vinylquinoline.

9 Claims, 1 Drawing Sheet

LAKYER FOR STABILIZATION OF LITHIUM ANODE

FIELD OF THE INVENTION

This invention relates to electrochemical batteries, and more particularly, to improved electrode and electrode-current collector assemblies for such batteries.

BACKGROUND OF THE INVENTION

Batteries, with metallic electrodes, have a limited life-cycle due to the degradation of the metallic electrodes. For example, lithium, when used as the negative electrode, is attacked and/or passivated by electrolytes. This results in formation of lithium powder with a very high surface area at the interface between the metallic lithium and the electrolyte. The formation of high surface area lithium powder is undesirable because it reacts violently with moisture and air and results in degradation of cell performance.

Composite anode alternatives have been suggested to overcome such problems, but they are prone to a large loss of capacity as compared to metallic lithium. Lithium alloy active materials have a relatively short cycle life due to mechanical degradation of the electrode.

Therefore, what is needed is a cell construction and method of operation which overcomes problems with passivation in order to prevent degradation of cell performance.

SUMMARY OF THE INVENTION

According to one aspect of the invention, there is provided an electrochemical cell which has a negative electrode which comprises a solid body comprising an active metal material preferably consisting of lithium metal or compounds thereof and having a major surface facing an electrolyte or an electrolyte separator; and a layer disposed between the major surface of the negative electrode and the electrolyte. Preferably, the layer is a coating carried on the major surface of the negative electrode. The coating comprises an organic polymer material intermingled with iodine forming a polymer-iodine complex. Desirably, the iodine is in ionic or particle form and dispersed with the polymer. The coating is a conductor of electrons and a conductor of the active metal ions (Li+) of the negative electrode. The coating is of a thickness sufficient to restrict penetration of electrolyte therethrough, while at the same time, conduct electrons and positive lithium ions. Desirably, the organic polymer is polyvinyl pyridine (PVP) or derivatives thereof such as poly-2-vinylpyridine (P2VP), and the polymer is impregnated with particles of iodine.

The anode coating of the invention is useful for protecting metallic lithium anodes in batteries having cathodes which do not include iodine as an active material. Preferred cathode active materials include transition metal chalcogen compound having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se.

Accordingly, it is an object of the present invention to provide an improved electrochemical battery based on lithium which maintains its integrity over a prolonged life-cycle as compared to presently used batteries. Another object is to provide a conductive coating for an anode active material which prevents passivation at the surface of the anode adjacent the electrolyte.

These and other objects, features and advantages will become apparent from the following description of the preferred embodiments, appended claims and accompanying drawings.

BRIEF DESCRIPTION OF THE DRAWING

The FIGURE is an illustration of a cross-section of a lithium battery or cell embodying the invention.

DETAILED DESCRIPTION OF THE PREFERRED EMBODIMENTS

Figure 1:
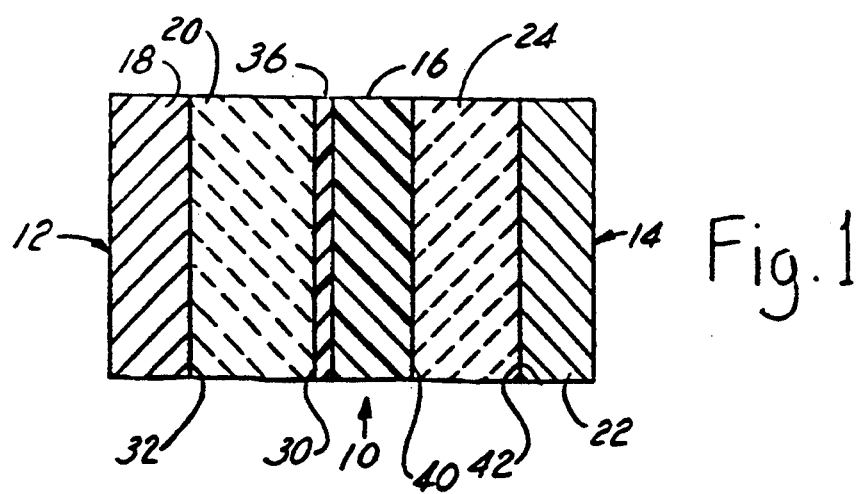

As shown in the FIGURE, an electrochemical cell or battery 10 has a negative electrode side 12, a positive electrode side 14, and a electrolyte separator 16 therebetween. In accordance with common usage, a battery may consist of one cell or multiple cells. The negative electrode side 12 is the anode during discharge, and the positive electrode side 14 is the cathode during discharge. The negative electrode side 12 includes current collector 18, typically of nickel, iron, aluminum, stainless steel, and/or copper foil, and a body of negative electrode active material 20. The negative electrode active material 20, preferably consists of metallic lithium or compounds or alloys thereof, and is sometimes simply referred to as the negative electrode. The body of the negative electrode 20 has first and second opposed major surfaces 30, 32. The first surface 30 faces electrolyte separator 16 and the second surface 32 faces current collector 18.

The positive electrode side 14 includes current collector 22, typically of aluminum, nickel, iron, stainless steel, and/or copper, and a body of positive electrode active material 24. The positive electrode active material 24 is sometimes simply referred to as the positive electrode. The positive electrode active material is preferably transition metal chalcogen compound having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se. The body of the positive electrode 24 has first and second opposed major surfaces 40, 42. The first surface 40 faces the electrolyte separator 16 and the second surface 42 faces current collector 22.

The separator 16 is typically a solid electrolyte, electrolyte separator. A suitable electrolyte separator is described in U.S. Pat. No. 4,830,939 incorporated herein by reference. The electrolyte separator is a solid, preferably polymeric matrix, containing an ionically conductive liquid with an alkali metal salt where the liquid is an aprotic polar solvent. The terms "solid electrolyte" and "electrolyte separator" are used interchangeably in industry. Sometimes, the term "separator" is used.

The rechargeability of lithium batteries is limited by the cyclability of the lithium metal anode which converts to high surface area powder during cycling. This is called "passivation" and it occurs at the surface 30 facing the electrolyte separator 16. Electronic contact to the powder is lost and the capacity of the battery decreases. Furthermore, the lithium powder is highly reactive and may ignite if the battery is heated as by short circuit, other high current drain or external heat source, or if punctured causing reaction between lithium and the ambient atmosphere.

According to one aspect of the invention, to prevent passivation a conductive layer of polymeric material and iodine 36 is disposed between the first surface 30 of negative electrode 20 and electrolyte separator 16. Preferably, the coating 36 is carried on the first surface 30 of the negative electrode 20. Preferably, the layer comprises a polymer which is polyvinyl pyridine or a derivative thereof and iodine in ionic or particle form dispersed with and complexed with the polymer.

For descriptive purposes herein, the term "complex" refers to any single phase iodine and polyvinyl pyridine (PVP) mixture. Polyvinyl pyridine, and its derivatives including poly-2-vinylpyridine and poly-2-vinylquinoline (poly-2-vinyl-benzo[b] pyridine) are generally referred to as PVP. Poly-2-vinylpyridine may be abbreviated as P2VP, and poly-2-vinylquinoline may be abbreviated as P2VQ. The term "$I_2$/PVP" refers to a material composed of a "complex" and also includes excess iodine and/or PVP present as a solid phase, the overall amount of initial iodine contained in the material being expressed in terms of weight percent, as is the overall amount of the poly-2-vinylpyridine.

It is required that sufficient iodine be present to render the PVP layer conductive. Thus, the theoretical lower limit is greater than zero iodine, since PVP alone is not very conductive. It is thought that too much iodine is undesirable because too much $I_2$ results in a hard material which will have a tendency to break or crack whereby electrolyte components can leak through the layer and react with lithium. It should be noted that too high an amount of polymer may result in either an insulating film or a liquid interface layer. A basic pyridine unit contains one nitrogen atom. The basic pyridine unit has the general formula $C_5H_5N$. It is desirable to have at least 2 moles of $I_2$ for each basic pyridine unit. This is also conveniently expressed as at least 2 moles of $I_2$ for each atom of nitrogen in the basic pyridine unit. This relative amount of $I_2$ to PVP polymer pertains to any pyridine derivative. It is desirable to have up to about 15 moles of $I_2$ for each atom of nitrogen in the pyridine unit. As much as 24 parts $I_2$ to one part polymer unit or nitrogen thereof has been known to remain flexible. The layer 36 of $I_2$/PVP complex prevents passivation and resolves safety and cyclability problems associated with lithium electrodes by preventing contact between the electrolyte and the metallic lithium. This prevents degradation caused by reaction between these two components of the cell. The layer 36 which separates the lithium and the electrolyte is both lithium ion conductive and electronic conductive.

The characteristics of the preferred $P_2VP$-$I_2$ mixtures have been reported by others, where such mixtures are used as a positive electrode (cathode) active material. Such cathode materials are reported in the literature and patents. The following describes physical properties of PVP, P2VP, and $I_2$/PVP and they are incorporated herein by reference in their entirety: U.S. Pat. Nos. 4,340,651 (Howard); RE 31,532 and 4,148,975 (Schneider); 4,182,798 (Skarstad) and 3,773,557. A typical composition, which gives a plastic flexible coating, comprises 2 to 15 moles of $I_2$ for each atom of N (in PVP, preferably poly-2-vinylpyridine), as stated in RE 31,532 (reissue of U.S. Pat. No. 3,674,562). In another example, the composition is 7 to 24 parts of $I_2$ to 1 part of polymer, and the average molecular weight of the polymer is typically 13,000. The PVP may be substituted with other polymers such as poly-2-vinylquinoline described in U.S. Pat. No. 4,148,975 incorporated herein by reference in its entirety. Some pyridine-containing polymers are used in lithium/iodine batteries as a positive electrode (cathode). (See A. A. Schneider et al, "Performance Characteristics of a Long Life Pacemaker Cell", in D. H. Collins (ed.), Power Sources 5, Proc. 9th Int. Symp., Brighton 1974, Academic Press, London 1975.) However, $I_2$/PVP protective coating on an anode is not known to have been suggested. Methods for forming an $I_2$/PVP layer are as described in the following patents incorporated herein by reference in their entirety: U.S. Pat. Nos. 4,340,651 (Howard); RE 31,532 (Schneider reissue of 3,674,562); 4,182,798; 3,773,557; 3,957,533 and 4,071,662 (Mead). Howard et al describes forming a cathode material of the iodine poly-2-vinylpyridine type containing various amounts of iodine. The conventional preparation of iodine poly-2-vinylpyridine cathode material involves heating the constituents at various temperatures and times. Generally speaking, the temperatures range from about 93° C. (200° F.) to 150° C. (300° F.) and the time of heating may range from hours to days. The heat reaction in this instance is in the order of about 200° F. to 300° F., preferably 250° F. Similarly, the cathode material is heated to a temperature greater than the crystallization temperature of iodine. Such basic methods are more fully described in Mead U.S. Pat. No. 3,773,557, cited above.

The materials may be prepared from mixtures of iodine and poly-2-vinylpyridine by mixing the components together and holding them at 300° F. The ratio described for iodine to poly-2-vinylpyridine by weight varies up to about 95.2% by weight iodine.

Poly-2-vinylpyridine is commercially available from various chemical companies, and at a wide-range of molecular weights. If desired, the polymer may also be synthesized as follows: Benzoyl peroxide (2.0 grams) is dissolved in freshly distilled 2-vinylpyridine (200 grams). Water (400 ml) is added and the mixture is purged with nitrogen for 1 hour. With continued purging, the mixture is heated at 85° C. (184.5° F.) with stirring and kept at that temperature for 2 hours. The organic phase thickens and develops a brown color during this time. The mixture is cooled; the aqueous phase is discarded and the organic phase is dried overnight at 60° C. (140° F.) in a vacuum oven. The residue is ground into fine granules and dried to a constant weight at 60° C. (140° F.) in a vacuum oven. The yield is about 162 grams (81%) poly-2-vinylpyridine. The average molecular weight of the polymer product is preferably greater than 13,000. Theoretically, there is no upper limit and molecular weights over 100,000 are known. It can be seen from the above discussion that iodine poly-2-vinylpyridine materials may be prepared in various physical forms and utilizing differing molecular weight polymer. Moreover, it has become generally accepted that various amounts of iodine can be included in the conventionally prepared material.

In order to form an $I_2$/PVP protective coating or layer for an anode, the preferred $I_2$/P2PV material, may be prepared by heating the poly-2-vinylpyridine and iodine mixture, or the poly-2-vinylpyridine can be heated with lesser amounts of iodine followed by subsequent addition of appropriate amounts of iodine, in the conventional manner i.e. to a temperature greater than the crystallization temperature of iodine, but below about 150° C. (300° F.). For example, heating to 200° F. to 300° F. is satisfactory and it may be maintained for several hours or days. Various combinations of times and temperatures within these ranges may be used as previously described hereinabove. The resulting mixture while at temperature is a flowable substance which may be shaped into a thin sheet or applied as a coating since it substantially solidifies into a relatively solid material upon cooling.

Further, the I$_2$/P2VP mixture is at or near ordinary ambient room temperatures a putty-like, pliable solid that is sufficiently plastic to be spread on or applied to a solid substrate, such as a sheet of anode metal. The materials are useable in cells at temperatures up to the point where softening causes loss of dimensional stability. This point depends on the degree of polymerization of the organic component of the I$_2$/P2VP charge transfer complex. It is believed that the plastic state of the materials permits excellent atomic bonding of the materials to the anode.

The coating protects the anode from reaction with the lithium because the I$_2$ reacts with lithium to form LiI which, contrary to the I$_2$ and the polymers, is an ionic conductor of lithium ions and therefore, it is desired that all I$_2$ be converted to LiI.

TABLE 1

| Layer Thickness ($\mu$m) | Resistance (ohm) | Voltage Drop (V) |
|---|---|---|
| 1 | 1.000.000 | 1000 |
| 0.1 | 1.00.000 | 100 |
| 0.01 | 10.000 | 10 |
| 0.001 | 1.000 | 1 |
| 0.0001 | 100 | 0.1 |
| 0.00001 | 10 | 0.01 |
| 0.000001 | 1 | 0.001 |

However, the conductivity of this electrolyte is not very high, typically $10^{-7}$ S/cm at 25° C. for pure and probably not much higher for the mixture. Assuming the conductivity to be $10^{-7}$ S/cm and a current density of 1 mA/cm$^2$ in the battery, the associated resistances and voltage drops as function of the layer thickness of the coating are given in the table. A voltage drop of the order of 100 mV about may be acceptable, which means that the upper limit of the thickness of the coating is on the order of 0.0001 $\mu$m and maximum 0.001 $\mu$m. In use, metal ions, such as lithium (Li+) are transported through the iodine-polymer layer disposed between the negative electrode and the electrolyte. By this mechanism, direct interaction between metallic lithium and electrolyte is avoided. Accordingly, passivation at the surface of the negative electrode is prevented or at least reduced. Further, the iodine reacts with lithium to form LiI at the anode. Thus, the I$_2$/PVP coating on the lithium anode prevents reaction between the lithium anode and organic electrolyte components and the electrolyte salt. Due to the relatively low conductivity of the LiI, at about $10^{-7}$ Siemens/cm (S/cm), the thickness of the I$_2$/PVP layer should be on the order of micron size. The thickness should be less than 100 microns, and preferably less than 10 microns.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims:

1. In a battery having a negative electrode having an active material which comprises metallic lithium and an electrolyte separator comprising a solid matrix material and an electrolyte having a salt of lithium, the negative electrode having a major surface facing the matrix material, the improvement comprising: a layer disposed between the solid matrix material and the major surface of the negative electrode; said layer comprising a polyvinylpyridine or a polyvinylquinoline polymer; and iodine complexed with said polymer for reducing passivation of said lithium-containing negative electrode.

2. A battery comprising:
a) a negative electrode having an active material which comprises metallic lithium;
b) a positive electrode having an active material comprising a transition metal chalcogen compound having a reversible lithium insertion ability;
c) an electrolyte separator comprising a polymeric matrix material and an electrolyte having a salt of lithium, the solid matrix material being disposed between the positive and negative electrodes; and
d) a layer disposed between the solid matrix material and the surface of the negative electrode facing the matrix material, and comprising iodine complexed with a polyvinylpyridine or a polyvinylquinoline polymer for reducing passivation of said lithium-containing negative electrode.

3. The battery according to claim 2 wherein the polymer is poly-2-vinylquinoline.

4. In a battery having a negative electrode body having an active material which comprises metallic lithium, a positive electrode body having an active material comprising a metal chalcogen compound having a reversible lithium insertion ability, and an electrolyte separator comprising a solid matrix material and an electrolyte having a salt of lithium, the matrix material being disposed between the positive and negative electrode bodies, the improvement comprising:
a layer disposed between the matrix material and a surface of the negative electrode body facing the matrix material, said layer comprising a polymer and iodine in ionic or particle form dispersed with said polymer for reducing passivation of said lithium-containing negative electrode, wherein said polymer is selected from the group consisting of poly-2-vinylpyridine and poly-2-vinylquinoline.

5. The battery according to claim 4, wherein the polymer is poly-2-vinylpyridine.

6. In a battery having a negative electrode having an active material which comprises metallic lithium and an electrolyte separator comprising a solid matrix material and an electrolyte having a salt of lithium, the negative electrode having a major surface facing the matrix material, the improvement comprising:
a layer disposed between the solid matrix material and the major surface of the negative electrode; said layer comprising a polymer which is a conductor of electrons, permeable to lithium ions and capable of restricting penetration of electrolyte therethrough, and iodine complexed with said polymer for reducing passivation of said lithium-containing negative electrode, wherein said polymer is selected from the group consisting of poly-2-vinylpyridine and poly-2-vinylquinoline.

7. The battery according to claims 6, wherein the polymer is poly-2-vinylpyridine.

8. A battery comprising:
a) a negative electrode having an active material which comprises metallic lithium;

b) a positive electrode having an active material transition metal chalcogen compound having a reversible lithium insertion ability;

c) an electrolyte separator comprising a polymeric matrix material and an electrolyte having a salt of lithium, the solid matrix material being disposed between the positive and negative electrodes; and d) a layer disposed between the solid matrix material and the surface of the negative electrode facing the matrix material, and comprising a polymer and iodine complexed with said polymer for reducing passivation of said lithium-containing negative electrode, wherein the polymer is poly-2-vinylpyridine.

9. In a battery having a negative electrode body having an active material which comprises metallic lithium, a positive electrode body having an active material comprising a metal chalcogen compound having a reversible lithium insertion ability, and an electrolyte separator comprising a solid matrix material and an electrolyte having a salt of lithium, the matrix material being disposed between the positive and negative electrode bodies, the improvement comprising a layer disposed between the matrix material and a surface of the negative electrode body facing the matrix material, said layer comprising: a polyvinylpyridine or a polyvinylquinoline polymer; and iodine in ionic or particle form dispersed with said polymer for reducing passivation of said lithium-containing negative electrode.

* * * * *

UNITED STATES PATENT AND TRADEMARK OFFICE
CERTIFICATE OF CORRECTION

PATENT NO. : 5,342,710
DATED : August 30, 1994
INVENTOR(S) : Rene Koksbang

It is certified that error appears in the above-indentified patent and that said Letters Patent is hereby corrected as shown below:

On the title page, item [54] and column 1, lines 2 and 3, "LAKYER FOR STABILIZATION OF LITHIUM ANODE" should read --LAYER FOR STABILIZATION OF LITHIUM ANODE--.

Signed and Sealed this

Fourteenth Day of February, 1995

Attest:

BRUCE LEHMAN

*Attesting Officer*           *Commissioner of Patents and Trademarks*